(12) United States Patent
Chen et al.

(10) Patent No.: US 10,606,328 B2
(45) Date of Patent: Mar. 31, 2020

(54) ACCESSORY FOR A PORTABLE ELECTRONIC DEVICE AND COMBINATION OF THE ACCESSORY AND THE PORTABLE ELECTRONIC DEVICE

(71) Applicant: Acer Incorporated, New Taipei (TW)

(72) Inventors: Sheng-Yan Chen, New Taipei (TW); Hsueh-Chih Peng, New Taipei (TW); Wen-Neng Liao, New Taipei (TW); Cheng-Wen Hsieh, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/291,089

(22) Filed: Mar. 4, 2019

(65) Prior Publication Data

US 2019/0302860 A1  Oct. 3, 2019

(30) Foreign Application Priority Data

Mar. 28, 2018 (TW) .............................. 107110618 A (51) Int. Cl.
*G06F 1/20* (2006.01)
*G06F 3/03* (2006.01)
(Continued)

(52) U.S. Cl.
CPC .............. *G06F 1/203* (2013.01); *G06F 1/169* (2013.01); *G06F 1/1632* (2013.01); *G06F 3/03547* (2013.01)

(58) Field of Classification Search
CPC .......... G06F 3/017; G06F 3/013; G06F 1/163; G06F 3/0488; G06F 3/011; G06F 3/04847; G06F 3/0482; G06F 3/04842; G06F 3/005; G06F 3/04883; G06F 3/0481; G06F 3/04817; G06F 3/0484; G06F 3/012; G06F 21/32; G06F 19/3418; G06F 1/26; G06F 3/167; G06F 3/0304; G06F 3/041; G06F 3/0412; G06F 19/00; G06F 3/04886; G06F 3/16; G06F 1/203; G06F 1/1632; G06F 1/169; G06F 3/03547

See application file for complete search history.

(56) References Cited

U.S. PATENT DOCUMENTS 7,800,903 B2 *  9/2010  Wang ..................... G06F 1/203
                                                 361/679.48
8,089,753 B2 *  1/2012  Dotson .................. A45C 11/00
                                                 165/122

(Continued)

FOREIGN PATENT DOCUMENTS

TW          M505793 U     7/2015

*Primary Examiner* — Adam B Dravininkas
(74) *Attorney, Agent, or Firm* — Alan D. Kamrath; Mayer & Williams PC (57) ABSTRACT

An accessory is selectively coupled in a first position or a second position to a portable electronic device. The accessory includes a touch unit and a heat dissipation unit. The touch unit is configured to be touched by a user to apply a contact force. An area of the touch unit to be touched by the user is defined as a contact point. When the accessory is in the first position, the touch unit detects a location of the contact point and outputs a control signal to the portable electronic device. The heat dissipation unit comes in contact with a heat source of the portable electronic device when the accessory is in the second position.

17 Claims, 5 Drawing Sheets

(51) Int. Cl.
*G06F 3/0354* (2013.01)
*G06F 1/16* (2006.01)

(56) References Cited

U.S. PATENT DOCUMENTS

| | | | | |
|---|---|---|---|---|
| 8,493,732 B2 * | 7/2013 | Lineal | ............... | A47B 23/04 |
| | | | | 361/679.48 |
| 9,395,773 B1 * | 7/2016 | Huang | ............... | G06F 1/203 |
| 2008/0084661 A1 * | 4/2008 | Lee | ............... | G06F 1/203 |
| | | | | 361/679.48 |
| 2008/0253075 A1 * | 10/2008 | Haglund | ............... | G06F 1/203 |
| | | | | 361/679.46 |
| 2010/0134976 A1 * | 6/2010 | Kuo | ............... | G06F 1/1632 |
| | | | | 361/695 |
| 2014/0098486 A1 * | 4/2014 | Davis | ............... | G06F 1/1607 |
| | | | | 361/679.41 |
| 2017/0344059 A1 * | 11/2017 | Shibayama | ............... | H05K 7/2039 |

* cited by examiner

ACCESSORY FOR A PORTABLE ELECTRONIC DEVICE AND COMBINATION OF THE ACCESSORY AND THE PORTABLE ELECTRONIC DEVICE

BACKGROUND OF THE INVENTION

The present invention relates to an accessory for a portable electronic device and, more particularly, to an accessory for integrating a touch control function and a heat dissipation function for use on a portable electronic device.

Currently available notebook computers generally include a touch pad that cannot be detached, leading to limitation in designing of products. Furthermore, most game players use an external mouse to play games, providing smooth operation and increasing operational accuracy. When using an external mouse, the touch pad is defaulted to be disabled to avoid inadvertent touch of the touch pad, such that the users seldom use the touch pad. Furthermore, the heat dissipation demand is increased when playing games. As a result, the space utilization of the touch pad is low. Furthermore, the users have to purchase and install a heat dissipation pad for reducing the temperature for the purposes of obtaining a better game experience. However, the purchased heat dissipation pad may not match with the purchased notebook computer accurately. If the heat dissipation pad is simply placed externally of the notebook computer, the heat dissipation effect may not be satisfactory while failing to permit easy carriage. Furthermore, the heat dissipation pad occupies a considerable space when not in use. In view of the above, the space utilization of the touch pad and the heat dissipation pad is low. It is, therefore, an issue to persons in the art to improve the space utilization of the touch pad and the heat dissipation pad.

BRIEF SUMMARY OF THE INVENTION

An objective of the present invention is to provide an accessory for a portable electronic device to integrate the touch control function and the heat dissipation function, thereby increasing the space utilization.

In an aspect of the invention, an accessory is selectively coupled in a first position or a second position to a portable electronic device. The accessory includes a touch unit and a heat dissipation unit. The touch unit is to configured to be touched by a user to apply a contact force. An area of the touch unit to be touched by the user is defined as a contact point. When the accessory is in the first position, the touch unit detects a location of the contact point and outputs a control signal to the portable electronic device. The heat dissipation unit comes in contact with a heat source of the portable electronic device when the accessory is in the second position.

In another aspect of the invention, a combination includes a portable electronic device and an accessory. The portable electronic device generates a heat source when in operation. The portable electronic device includes a bottom side having an opening. The accessory is selectively coupled in a first position or a second position to the portable electronic device. The accessory includes a touch unit and a heat dissipation unit. The touch unit is configured to be touched by a user to apply a contact force. An area of the touch unit to be touched by the user is defined as a contact point. When the accessory is in the first position, the touch unit detects a location of the contact point and outputs a control signal to the portable electronic device. When the accessory is in the second position, the heat dissipation unit faces and is connected to the bottom side of the portable electronic device, and the heat dissipation unit contacts with the heat source of the portable electronic device via the opening.

In an example, the accessory further includes a body. The portable electronic device and the heat dissipation unit are mounted to the body. The body includes a front edge, a rear edge opposite to the front edge, a first side, and a second side opposite to the first side. The front edge is adapted to face the user. The rear edge faces the portable electronic device when the accessory is in the first position. The touch unit is mounted to the first side. The heat dissipation unit is mounted to the second side. The second side faces and is connected to the portable electronic device when the accessory is in the second position.

In an example, the touch unit is connected to the portable electronic device by a wired or wireless connection when the accessory is in the first position.

In an example, the touch unit includes a touch pad and at least one connecting portion configured to be connected to the portable electronic device. The touch pad protrudes beyond the first side of the body. The at least one connecting portion protrudes beyond the rear edge of the body. The at least one connecting portion is electrically connected to the portable electronic device when the accessory is in the first position.

In an example, the at least one connecting portion is a pogo pin.

In an example, the heat dissipation unit includes a contact member, at least one fan, and at least one conductive tube connected between the contact member and the at least one fan. The contact member and the at least one conductive tube are made of metal. The contact member protrudes beyond the second side of the body. The contact member comes in contact with the heat source of the portable electronic device when the accessory is in the second position, such that heat generated by the heat source is dissipated out of the body via the at least one conductive tube and the at least one fan.

In an example, the body includes a plurality of vents defined in each of the front edge and the rear edge, and the plurality of vents in the rear edge is aligned with the at least one fan.

In an example, the contact member has cross sections identical to cross sections of an opening of the portable electronic device, and the contact member is configured to contact with the heat source of the portable electronic device via the opening when the accessory is in the second position.

Thus, the accessory according to the present invention can be selectively coupled in the first position or the second position to the portable electronic device, such that the user can decide the function of the accessory according to the user need. Thus, the accessory according to the present invention not only solve the low space utilization of the conventional accessories (conventional touch pads and conventional heat dissipation pads) but provides easy carriage because the user does not have to carry many accessories.

Furthermore, the contact member of the heat unit contacts with the heat source of the portable electronic device via the opening when the accessory is in the second position. In comparison with a conventional heat dissipation pad simply placed at the outer side of a notebook computer, the quantity of the conducted heat can be increased significantly to achieve a rapid heat dissipation effect.

The present invention will become clearer in light of the following detailed description of illustrative embodiments of this invention described in connection with the drawings.

DETAILED DESCRIPTION OF THE INVENTION

With reference to FIGS. 1-5, an accessory 1 for a portable electronic device 2 according to the present invention can be selectively coupled in a first position (FIG. 2) or a second position (FIG. 5) to the portable electronic device 2, such as a notebook computer, a tablet computer, an electronic book, a mobile phone, a video player, or a video game console.

Figure 2:
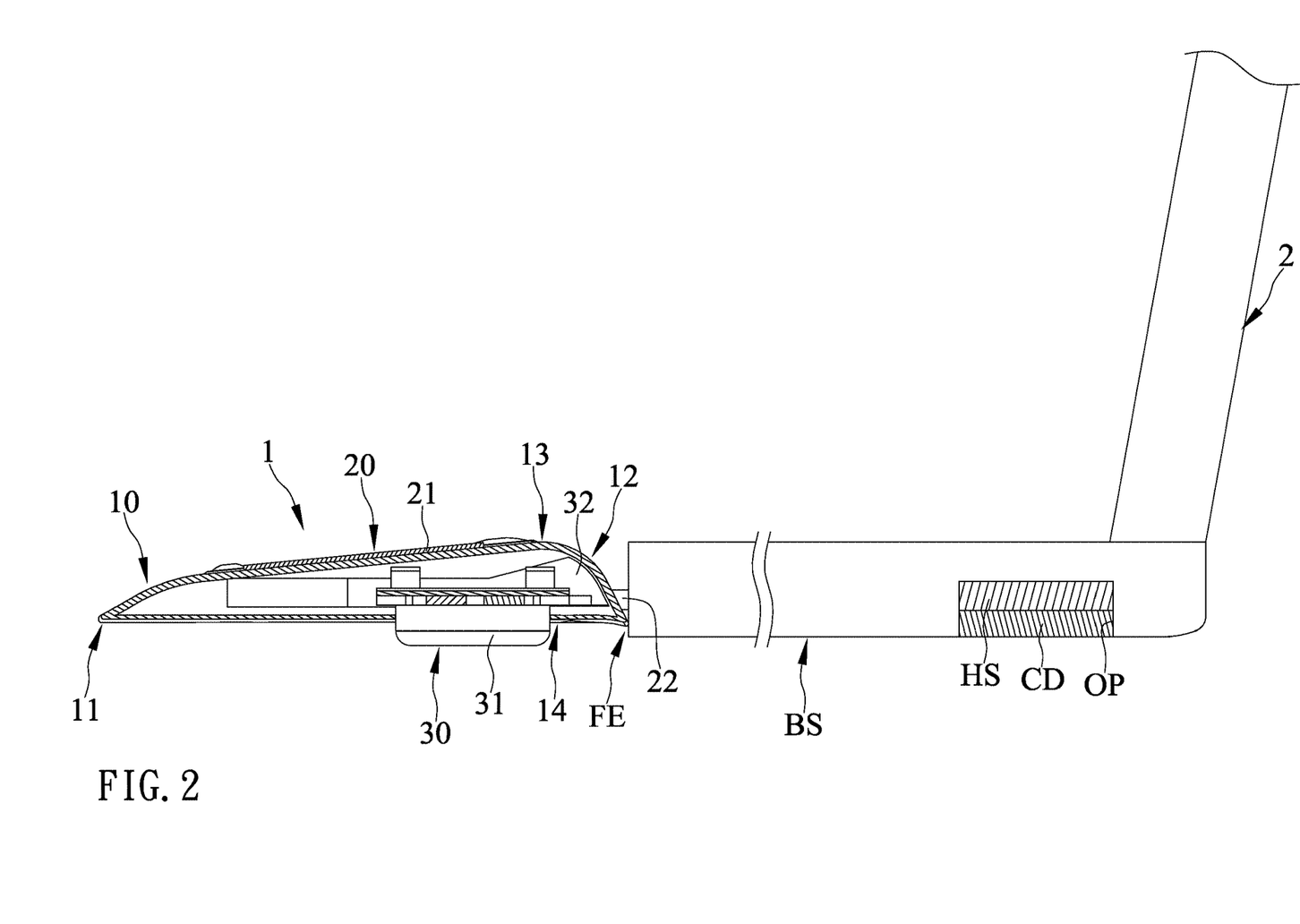
FIG. 2 is a diagrammatic cross sectional view of the accessory of FIG. 1 in a first position relative to a portable electronic device according to the present invention.
Figure 5:
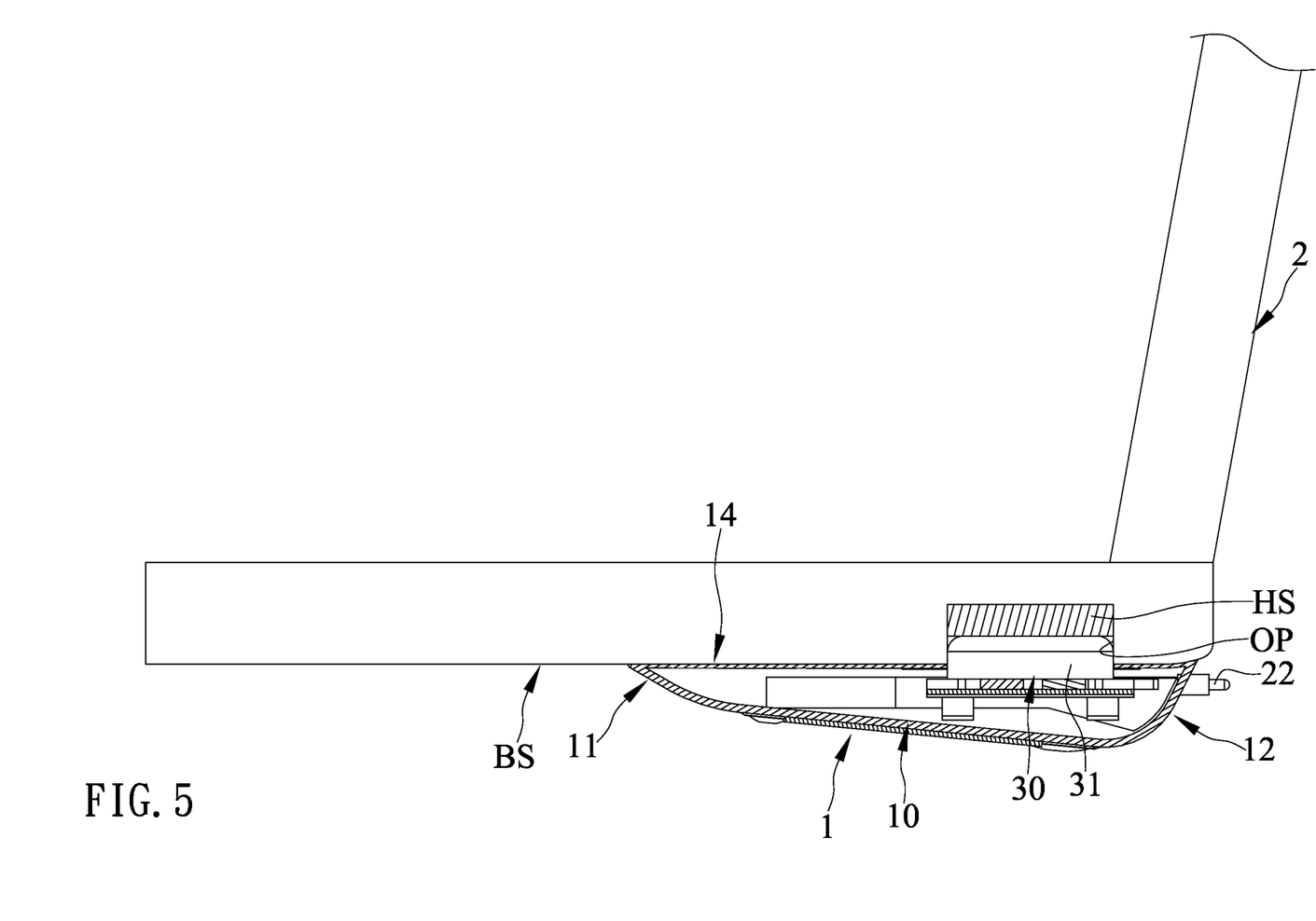
FIG. 5 is a diagrammatic cross sectional view of the accessory of FIG. 1 in a second position relative to the portable electronic device according to the present invention.

The portable electronic device 2 generates a heat source HS when in operation. The portable electronic device 2 includes a front edge FE and a bottom side BS. The bottom side BS of the portable electronic device 2 includes an opening OP and a cap door CD selectively covering the opening OP. The cap door CD reveals the opening OP when the accessory 1 is in the second position, such that the accessory unit 1 contacts with the heat source HS of the portable electronic device 2 via the opening OP. The cap door CD can be disposed on the bottom side BS by any known provision to selectively cover the opening OP. As an example, the cap door CP can be detachably mounted to the bottom side BS by screws, a tenon or a pivotal pin.

Figure 1:
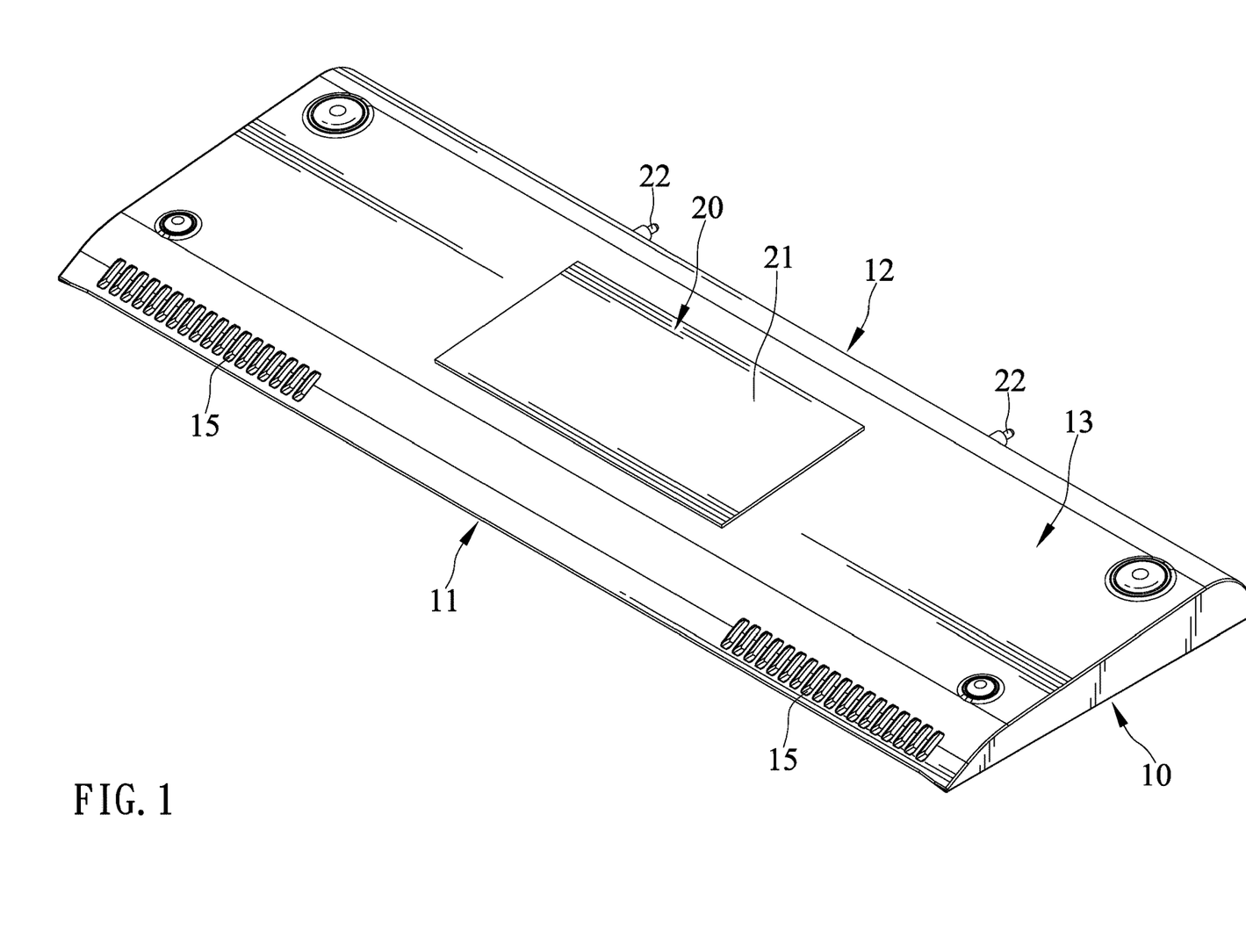
FIG. 1 is a perspective view of an accessory for a portable electronic device of an embodiment according to the present invention.

The accessory 1 includes a body 10, a touch unit 20, and a heat dissipation unit 30. The touch unit 20 is configured to be touched by a user to apply a contact force. An area of the touch unit 20 to be touched by the user is defined as a contact point. When the accessory 1 is in the first position, the touch unit 20 detects the location of the contact point and outputs a control signal to the portable electronic device 2. The portable electronic device 2 can read the control signal, which can be compiled by a driver and then outputted to a display (such as a screen) to show information of the contact point, which can be appreciated by one having ordinary skill in the art. The heat dissipation unit 30 faces and is connected to the bottom side BS of the portable electronic device 2 when the accessory 1 is in the second position, and the heat dissipation unit 30 contacts with the heat source HS of the portable electronic device 2 via the opening OP.

Figure 3:
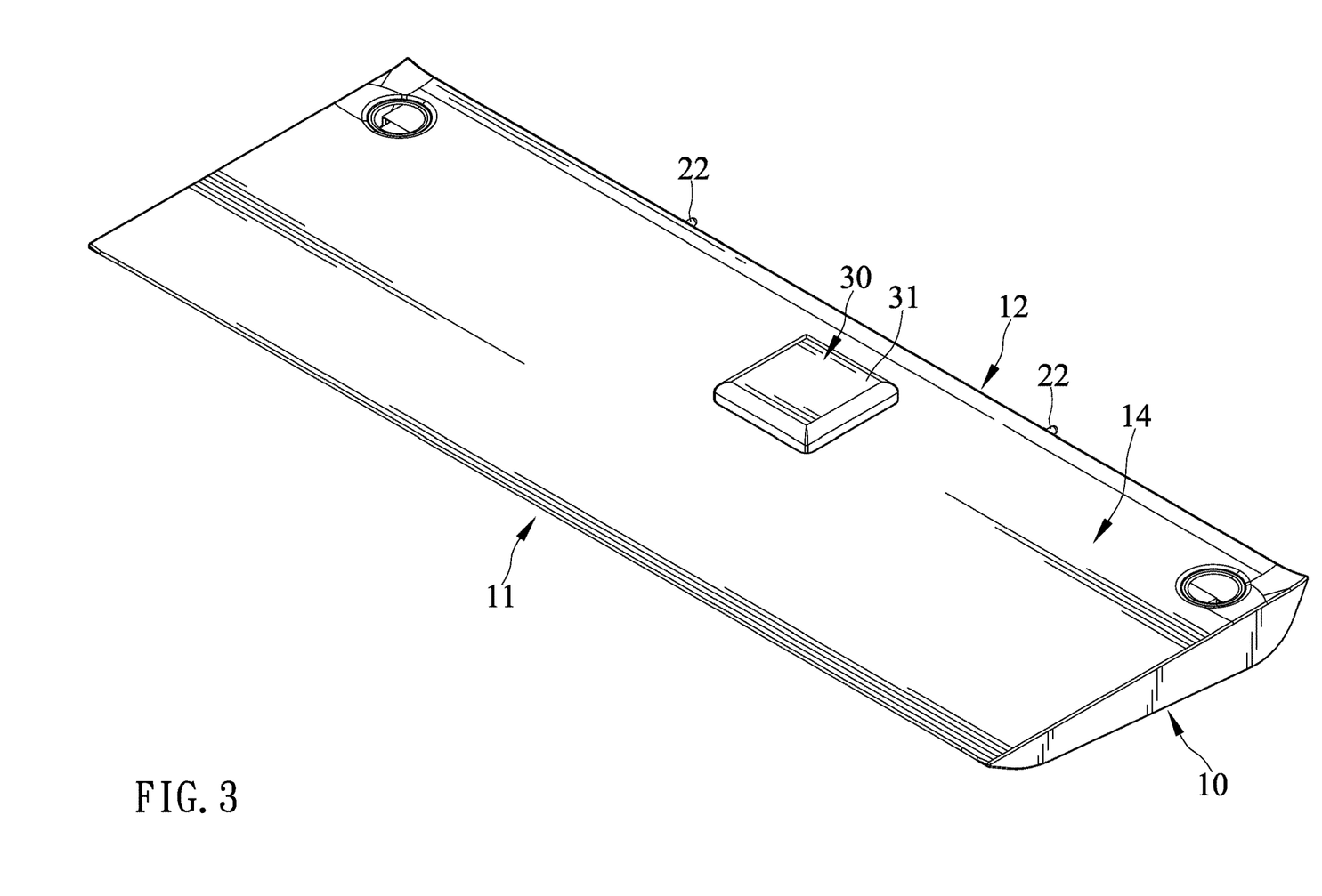
FIG. 3 is another perspective view of the accessory of FIG. 1.

The portable electronic device 2 and the heat dissipation unit 30 are mounted to the body 10. The body 10 includes a front edge 11, a rear edge 12 opposite to the front edge 11, a first side 13, and a second side 14 opposite to the second side 13. The front edge 11 is adapted to face the user. The rear edge 12 faces the portable electronic device 2 when the accessory 1 is in the first position. The touch unit 20 is mounted to the first side 13, and the heat dissipation unit 30 is mounted to the second side 14. The second side 14 faces and is connected to the portable electronic device 2 when the accessory 1 is in the second position. A plurality of vents 15 is defined in each of the front edge 11 and the rear edge 12. The plurality of vents 15 in the rear edge 12 is aligned with the heat dissipation fan 30.

With reference to FIG. 2, the touch unit 20 is connected to the portable electronic device 2 by a wired or wireless connection when the accessory 1 is in the first position. The wire connection can be achieved by a pogo pin, USB (universal serial bus), or any other wire connecting techniques. The wireless connection can be achieved by Bluetooth, near filed communication (NFC), or any other wireless connecting techniques. The touch unit 20 includes a touch pad 21 to be touched by a user and at least one connecting portion 22 configured to be connected to the front edge FE of the portable electronic device 2. The touch pad 21 protrudes beyond the first side 13 of the body 10, permitting the user to touch the touch pad 21 and, thus, apply a touch force. An area of the touch pad 21 to be touched by the user is defined as the contact point. When the accessory 1 is in the first position, the touch pad 21 detects the location of the contact point and outputs a control signal to the portable electronic device 2. The at least one connecting portion 22 protrudes beyond the rear edge 12 of the body 10. The at least one connecting portion 22 is electrically connected to the front edge FE of the portable electronic device 2 when the accessory 1 is in the first position. In this embodiment, the at least one connecting portion 22 is a pogo pin, and the front edge FE of the portable electronic device 2 includes a connection port in association with the at least one connecting portion 22. The touch unit 20 can include two connecting portions 22 symmetrically disposed on the rear edge 12 of the body 10, permitting electrical connection to the front edge FE of the portable electronic device 2 when the accessory 1 is in the first position.

Figure 4:
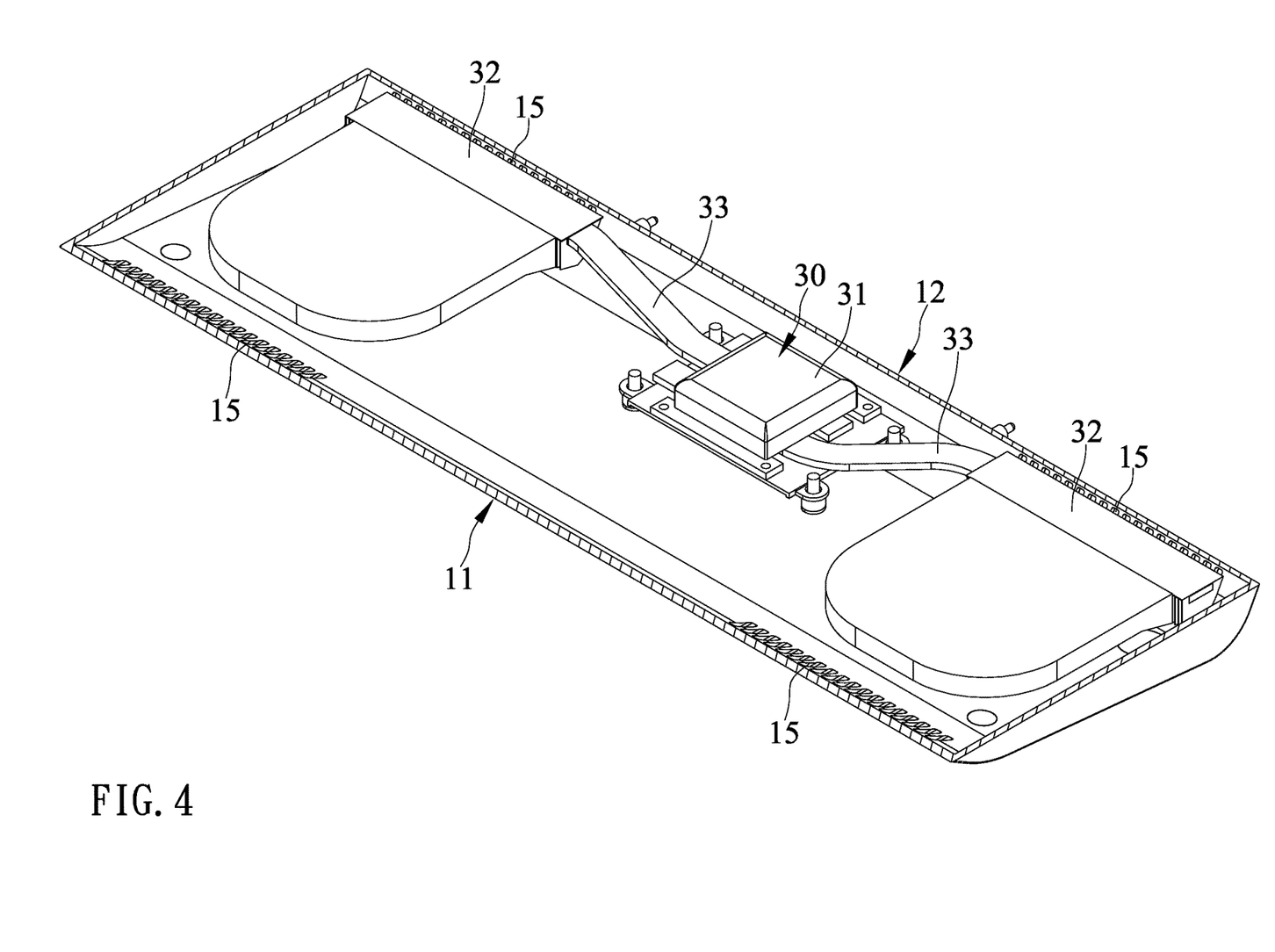
FIG. 4 is a perspective view of the accessory of FIG. 1, with a portion of the accessory cut away.

With reference to FIGS. 4 and 5, the heat dissipation unit 30 is connected to the portable electronic device 2 when the accessory 1 is in the second position. The heat dissipation unit 30 includes a contact member 31, at least one fan 32, and at least one conductive tube 33 connected between the contact member 31 and the at least one fan 32. The contact member 31 and the at least one conductive tube 33 are made of metal. The location of the at least one fan 32 is aligned with the plurality of vents 15 in the rear edge 12. The contact member 31 protrudes beyond the second side 14 of the body 10. The contact member 31 comes in contact with the heat source HS of the portable electronic device 2 when the accessory 1 is in the second position, such that heat generated by the heat source HS is dissipated out of the body 10 via the at least one conductive tube 33 and the at least one fan 32. In this embodiment, the heat dissipation unit 30 includes two fans 32 symmetrically disposed in the body 10 and two conductive tubes 33 symmetrically disposed in the body 10. The contact member 31 has cross sections identical to cross sections of the opening OP of the portable electronic device 2, such that the contact member 31 contacts with the heat source HS of the portable electronic device 2 via the opening OP when the accessory 1 is in the second position.

In view of the foregoing, the accessory 1 according to the present invention can be selectively coupled in the first position or the second position to the portable electronic device 2, such that the user can decide the function of the accessory 1 according to the user need. In an example of word processing or ordinary use, the user can connect the accessory 1 in the first position to the portable electronic device 2 to achieve the touch control function. When the user intends to play a game that would require heat dissipation to dissipate the heat generated during highly effective operation of the portable electronic device 2, the user can connect the accessory 1 in the second position to the portable electronic device 2 to achieve the heat dissipation function. Thus, the accessory 1 according to the present invention not only solve the low space utilization of the conventional accessories (conventional touch pads and conventional heat dissipation pads) but provides easy carriage because the user does not have to carry many accessories.

Furthermore, the contact member 31 of the heat unit 30 contacts with the heat source HS of the portable electronic device 2 via the opening OP when the accessory 1 is in the second position. In comparison with a conventional heat dissipation pad simply placed at the outer side of a notebook computer, the quantity of the conducted heat can be increased significantly to achieve a rapid heat dissipation effect.

Although specific embodiments have been illustrated and described, numerous modifications and variations are still possible without departing from the scope of the invention. The scope of the invention is limited by the accompanying claims.

The invention claimed is:

1. An accessory for a portable electronic device, wherein the accessory is selectively coupled in a first position or a second position to the portable electronic device, wherein the accessory comprises:
   a touch unit configured to be touched by a user to apply a contact force, wherein an area of the touch unit to be touched by the user is defined as a contact point, wherein when the accessory is in the first position, the touch unit detects a location of the contact point and outputs a control signal to the portable electronic device; and
   a heat dissipation unit, wherein the heat dissipation unit comes in contact with a heat source of the portable electronic device when the accessory is in the second position.

2. The accessory for the portable electronic device as claimed in claim 1, further comprising a body, wherein the portable electronic device and the heat dissipation unit are mounted to the body, wherein the body includes a front edge, a rear edge opposite to the front edge, a first side, and a second side opposite to the first side, wherein the front edge is adapted to face the user, wherein the rear edge faces the portable electronic device when the accessory is in the first position, the touch unit is mounted to the first side, wherein the heat dissipation unit is mounted to the second side, and wherein the second side faces and is connected to the portable electronic device when the accessory is in the second position.

3. The accessory for the portable electronic device as claimed in claim 2, wherein the touch unit is connected to the portable electronic device by a wired or wireless connection when the accessory is in the first position.

4. The accessory for the portable electronic device as claimed in claim 3, wherein the touch unit includes a touch pad and at least one connecting portion configured to be connected to the portable electronic device, wherein the touch pad protrudes beyond the first side of the body, wherein the at least one connecting portion protrudes beyond the rear edge of the body, and wherein the at least one connecting portion is electrically connected to the portable electronic device when the accessory is in the first position.

5. The accessory for the portable electronic device as claimed in claim 4, wherein the at least one connecting portion is a pogo pin.

6. The accessory for the portable electronic device as claimed in claim 2, wherein the heat dissipation unit includes a contact member, at least one fan, and at least one conductive tube connected between the contact member and the at least one fan, wherein the contact member and the at least one conductive tube are made of metal, wherein the contact member protrudes beyond the second side of the body, wherein the contact member comes in contact with the heat source of the portable electronic device when the accessory is in the second position, such that heat generated by the heat source is dissipated out of the body via the at least one conductive tube and the at least one fan.

7. The accessory for the portable electronic device as claimed in claim 6, wherein the body includes a plurality of vents defined in each of the front edge and the rear edge, and wherein the plurality of vents in the rear edge is aligned with the at least one fan.

8. The accessory for the portable electronic device as claimed in claim 6, wherein the contact member has cross sections identical to cross sections of an opening of the portable electronic device, and wherein the contact member is configured to contact with the heat source of the portable electronic device via the opening when the accessory is in the second position.

9. A combination comprising:
   a portable electronic device that generates a heat source when in operation, wherein the portable electronic device includes a bottom side having an opening; and
   an accessory selectively coupled in a first position or a second position to the portable electronic device, wherein the accessory includes a touch unit and a heat dissipation unit, wherein the touch unit is configured to be touched by a user to apply a contact force, wherein an area of the touch unit to be touched by the user is defined as a contact point, wherein when the accessory is in the first position, the touch unit detects a location of the contact point and outputs a control signal to the portable electronic device, wherein when the accessory is in the second position, the heat dissipation unit faces and is connected to the bottom side of the portable electronic device, and the heat dissipation unit contacts with the heat source of the portable electronic device via the opening.

10. The combination as claimed in claim 9, wherein the portable electronic device includes a cap door mounted to the bottom side to selectively cover the opening, wherein the cap door reveals the opening when the accessory is in the second position, such that the heat dissipation unit contacts with the heat source of the portable electronic device via the opening.

11. The combination as claimed in claim 9, wherein the accessory further includes a body, wherein the portable electronic device and the heat dissipation unit are mounted to the body, wherein the body includes a front edge, a rear edge opposite to the front edge, a first side, and a second side opposite to the first side, wherein the front edge is adapted to face the user, wherein the rear edge faces the portable electronic device when the accessory is in the first position, the touch unit is mounted to the first side, wherein the heat dissipation unit is mounted to the second side, and wherein the second side faces and is connected to the portable electronic device when the accessory is in the second position.

12. The combination as claimed in claim 11, wherein the touch unit is connected to the portable electronic device by a wired or wireless connection when the accessory is in the first position.

13. The combination as claimed in claim 12, wherein the touch unit includes a touch pad and at least one connecting portion configured to be connected to the portable electronic device, wherein the touch pad protrudes beyond the first side of the body, wherein the at least one connecting portion protrudes beyond the rear edge of the body, and wherein the at least one connecting portion is electrically connected to the portable electronic device when the accessory is in the first position.

14. The combination as claimed in claim 13, wherein the at least one connecting portion is a pogo pin.

15. The combination as claimed in claim 10, wherein the heat dissipation unit includes a contact member, at least one fan, and at least one conductive tube connected between the contact member and the at least one fan, wherein the contact member and the at least one conductive tube are made of metal, wherein the contact member protrudes beyond the second side of the body, wherein the contact member comes in contact with the heat source of the portable electronic device via the opening when the accessory is in the second position, such that heat generated by the heat source is dissipated out of the body via the at least one conductive tube and the at least one fan.

16. The combination as claimed in claim 15, wherein the body includes a plurality of vents defined in each of the front edge and the rear edge, and wherein the plurality of vents in the rear edge is aligned with the at least one fan.

17. The combination as claimed in claim 15, wherein the contact member has cross sections identical to cross sections of the opening of the portable electronic device.

\* \* \* \* \*